United States Patent [19]
Hull

[11] 4,313,347
[45] Feb. 2, 1982

[54] ENVIRONMENTAL TESTING SYSTEM

[75] Inventor: Frederick H. Hull, Ft. Washington, Pa.

[73] Assignee: The Budd Company, Troy, Mich.

[21] Appl. No.: 137,729

[22] Filed: Apr. 7, 1980

[51] Int. Cl.³ .............................................. G01N 29/04
[52] U.S. Cl. .................................................... 73/669
[58] Field of Search ........................... 73/669, 663, 665

[56] References Cited

U.S. PATENT DOCUMENTS

| | | | |
|---|---|---|---|
| 2,890,584 | 6/1959 | Dickie | 73/665 |
| 2,963,903 | 12/1960 | Ridgway et al. | 73/669 |

*Primary Examiner*—Anthony V. Ciarlante
*Attorney, Agent, or Firm*—A. L. Trueax, Jr.

[57] ABSTRACT

An environmental testing system for a product such as a railway car or a trailer includes a seismic mass having a "T" shaped cross-section, supported by a plurality of air mounts or cushioning means. The seismic mass is subjected to compression due to post tensioned reinforcement in three directions. A plurality of actuators are connected between the seismic mass and the product being tested to vibrate the product in accordance with a desired program. The reaction forces from the product under test are absorbed by the seismic mass and the air mounts. The air mounts are connected in series with a large air reservoir to permit the system to be tested under very low resonant frequency conditions.

8 Claims, 8 Drawing Figures

ENVIRONMENTAL TESTING SYSTEM

BACKGROUND OF THE INVENTION

1. Field of the Invention

The emphasis on safety and product liability in recent years has resulted in great demand for environmental testing of the products involved before mass production or allowing them to be sold to the public. Recalling products because of defects therein has resulted in tremendous costs to manufacturers especially when vehicles such as automobiles, trailers and railway cars are involved.

2. Prior Art

There are many methods employed for data acquisition and manipulation to permit manufacturers to generate accelerated life histories from road tests. These life histories for structural tests may be in the form of stored data or programs which are used to apply predetermined loads, displacements, strains or accelerations at selected locations on the product under test. The environmental diagnostic and endurance type testing of complete prototypes and production vehicles has become routine in industries involving moving vehicles.

One of the most important tests employed in a complete qualification testing of a vehicle involves vibration. Generally these vibrations are applied to the vehicle under test and range over a very wide spectrum of frequencies and must be applied over a wide range of force levels. In some cases, the environmental testing must also include consideration of the temperatures involved.

When relatively large vehicles, such as highway trailers and railway cars are involved, it is important that the reaction forces generated by the vibrations be isolated so as not to produce displacements of the area surrounding the test location. For example, when the testing occurs in a highly populated area or in a building, it is necessary that the reaction forces be absorbed and not be transmitted to the building or surrounding environment. Excess forces, if not properly absorbed, will generally shake or destroy a building or cause damage to buildings in the surrounding area.

OBJECTS OF THE INVENTION

It is an object of this invention to provide an improved environmental testing system for large products, especially vehicles such as trailers and railway cars.

It is a further object of this invention to provide an improved environmental testing system capable of simulating actual operating conditions and condensing the time required to simulate the total life of a vehicle under test.

It is a further object of this invention to provide an improved environmental testing system for large vehicles having a novel seismic mass for holding the vehicle under test.

It is still a further object of this invention to provide complete isolation between the seismic mass with the vehicle under test and its environment.

It is still a further object of this invention to provide an improved testing system in which a vehicle under test may be vibrated to frequencies as low as one-half Hertz.

BRIEF SUMMARY OF THE INVENTION

In accordance with the present invention, an environmental testing system for a product, such as a trailer or a railway car, includes a seismic mass having a T-shaped cross-sectional mass area. This mass is reenforced with tendons of steel under tension and is designed to accept the large reaction forces from actuators attached to the vehicle under test. The seismic mass is supported by a plurality of air mounts or cushioning means. The actuators are connected between the seismic mass and the product under test. The actuators are controlled by servo valves controlled by electronic means. The reaction forces generated by the vibration of the product is absorbed by the seismic mass and the air cushioning means.

Other objects and advantages of the present invention will be apparent and suggest themselves to those skilled in the art, from a reading of the following specification and claims, in conjunction with the accompanying drawings.

DESCRIPTION OF THE PREFERRED EMBODIMENTS

In describing the present invention, a trailer will be illustrated. The product under test, however, may be a railway car or any other large vehicle. Because the means and methods to physically move the vehicle to the test area are only incidentally related to the present invention and known to those skilled in the art, they will not be shown or described in detail. Generally, however, the vehicle to be tested may be supported on a relatively strong frame or beam members as it is moved into position. The ends of the beam members may be moved over tracks located on either side of the pit. The product under test is secured to the beam elements and the beam elements are then moved over the track until the product under test is over the test area. Various means are then employed to support the vehicle under test while final positioning and transfer to the actuators is accomplished.

Figure 1:
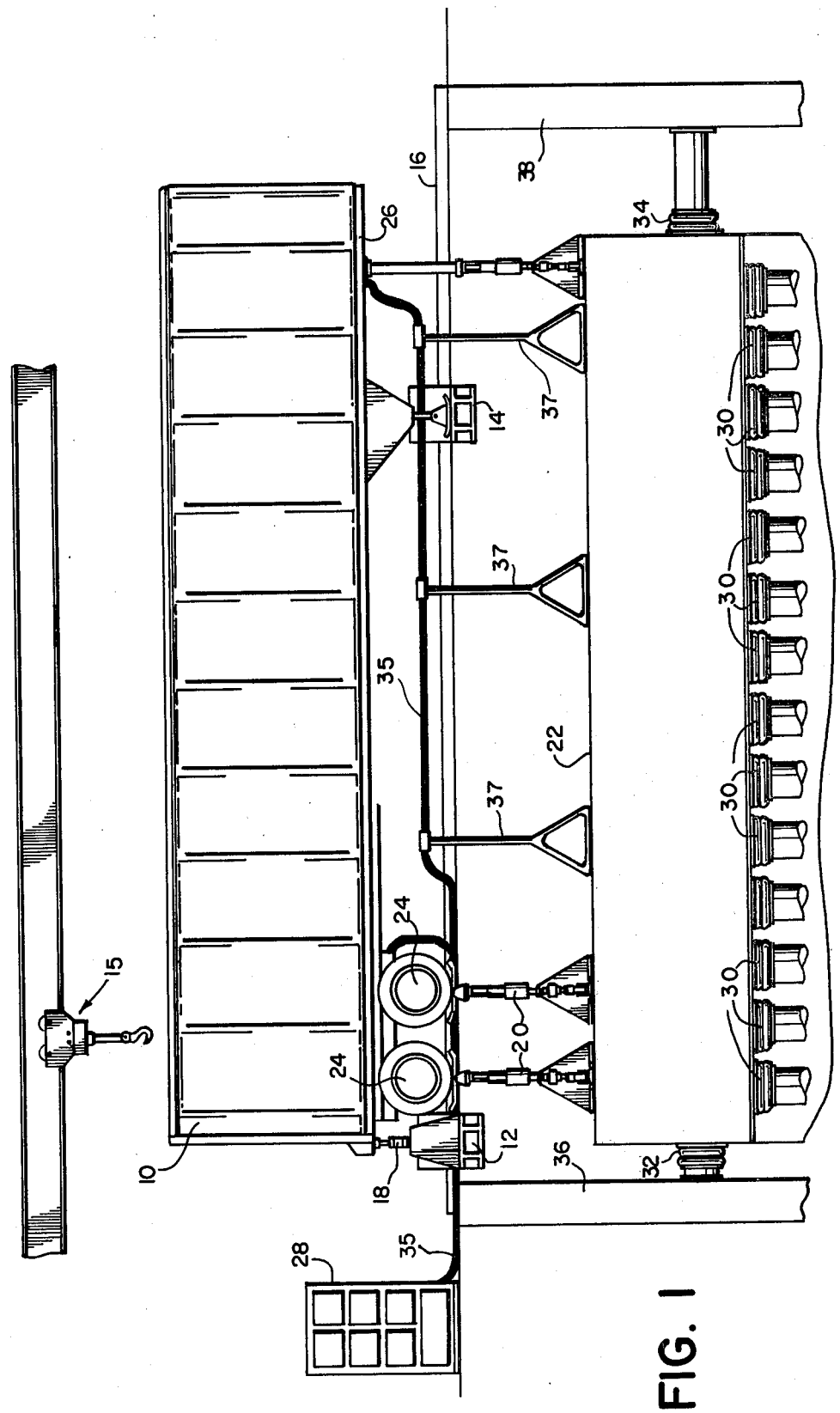
FIG. 1 is a side view illustrating a trailer under test in an environmental testing system, in accordance with the present invention.

Referring particularly to FIG. 1, a trailer 10 is supported by transfer dollys 12 and 14 which are moved over a pair of tracks, only one of which track 16 is illustrated, until it is over the pit of the test area. The trailer is supported by jacks, such as jack 18, as it is being moved. An overhead crane arrangement 15 may be employed in moving the trailer into position.

A plurality of actuators 20 are secured to a seismic mass 22 and are attached to the seismic mass 22 and the force input locations on the trailer 10 to be tested. For example, the actuators may be placed under the wheels 24 of the trailer 10 or toward the front of the trailer at the king pin location 26. The actuators 20 may be placed at any desired points on the trailer 10. As will be subsequently described, the actuators 20 are firmly secured to the seismic mass 22 at one end and to the parts of the trailer under test at the other end.

The actuators 20 include servo valves and are operated by hydraulic coil. A control console 28 includes various electronic equipment for programming the operation of the actuators 20. For example, the input forces may result from displacements which were previously recorded on tapes from actual road conditions experienced by a similar trailer during road tests. The recorded information thus results from the actual operation of a trailer operating in a normal manner over the road. The control signals supplied by the console 28 may be employed to drive the actuators such that the resulting vibrations of the trailer 10 are as previously determined. The input data may also be modified to provide a speeded up environmental test, that is, simulate a relatively long life of the trailer in a relatively short time. The various means for acquiring data and recording it and utilizing it to test a vehicle are well known and therefore not described in detail.

The seismic mass 22 is supported at the bottom by a plurality of air cushions or mounts 30. The sides of the seismic mass 22 are supported by air cushioning means or mounts 32 and 34 connected between the end and side walls 36 and 38. The mounts 30, 32, and 34 are connected to a pressurized air source 31. A pit is required for receiving the seismic mass 22 so that it and various other testing elements can be positioned below the floor thus allowing the test specimen to be observed at normal floor height.

The output from the controllers in the console 28 is applied to the actuator servo valves. The connection is by electrical cable 35, supported on tripods 37. The servo valves within the actuators control the flow of hydraulic oil to the pistons causing them to extend or contract thus creating the required forces and displacements. This causes the vehicle or trailer 10 to vibrate in accordance with the input signals from the console 28. The signals may cause the trailer 10 to be vibrated in any number of desired ways. The signal from the console 28 may be prescribed sinusoidal or a random one which causes the vehicle to bounce up and down or in any other desired way. This is, in effect, a road simulator and can be equivalent to actual miles on a highway or test track.

Figure 2:
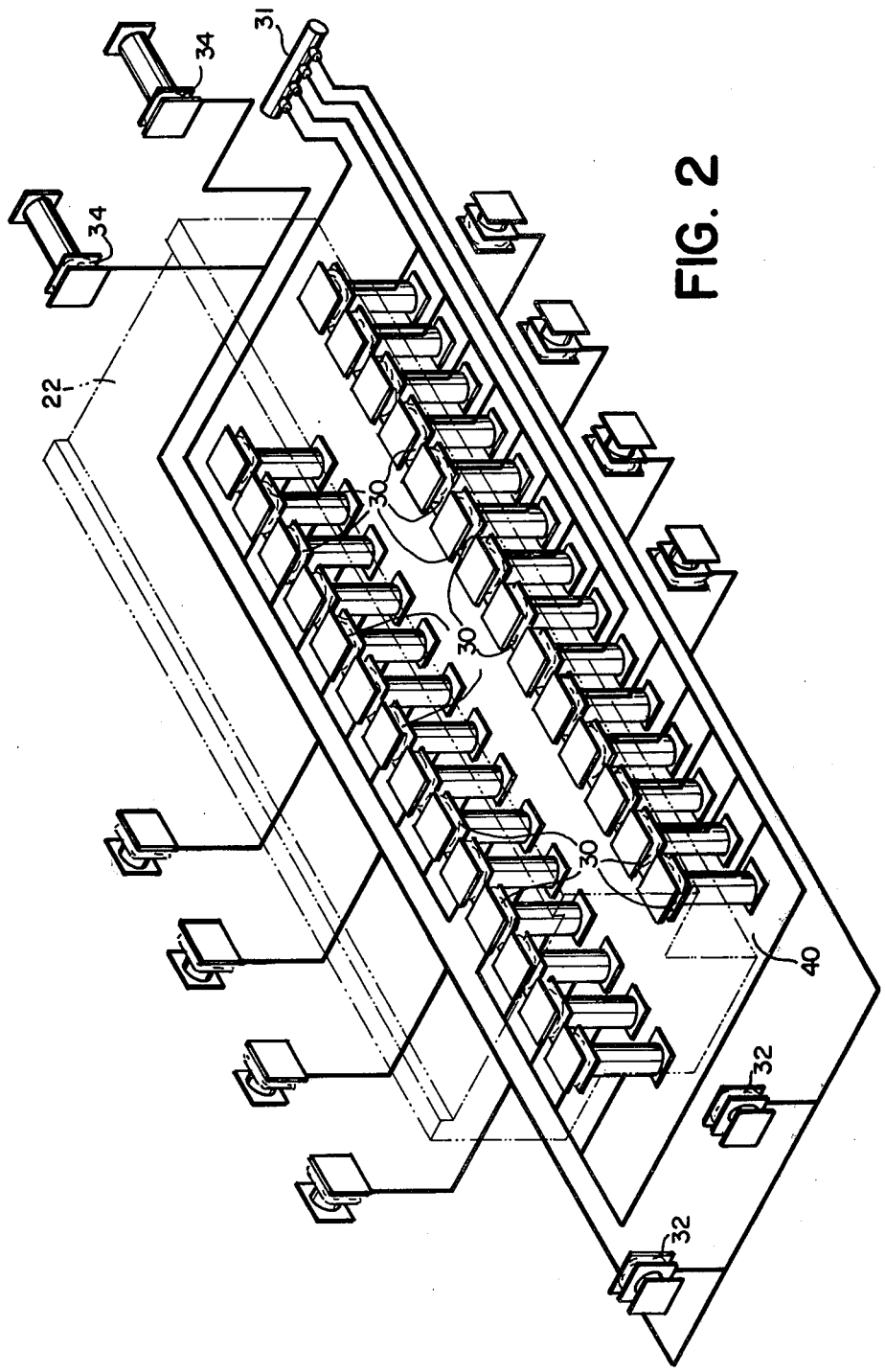
FIG. 2 is a isometric view illustrating the main elements of the isolation system involved in the environmental testing facility, in accordance with the present invention.

FIG. 2 illustrates the air mount isolation system supporting the seismic mass 22. The seismic mass 22 shown dotted is T-shaped in cross-section and is supported on the bottom on both sides by the air cushions 30. The air cushions 30 are connected between the seismic mass 22 and the floor 40 and walls of the pit. The air cushions 32 and 34 are connected between the sides of the seismic mass 22 and the end walls 36 and 38 (FIG. 1). Details of the various air cushioning means 30, 32 and 34 are illustrated in a separate figure.

Figure 3:
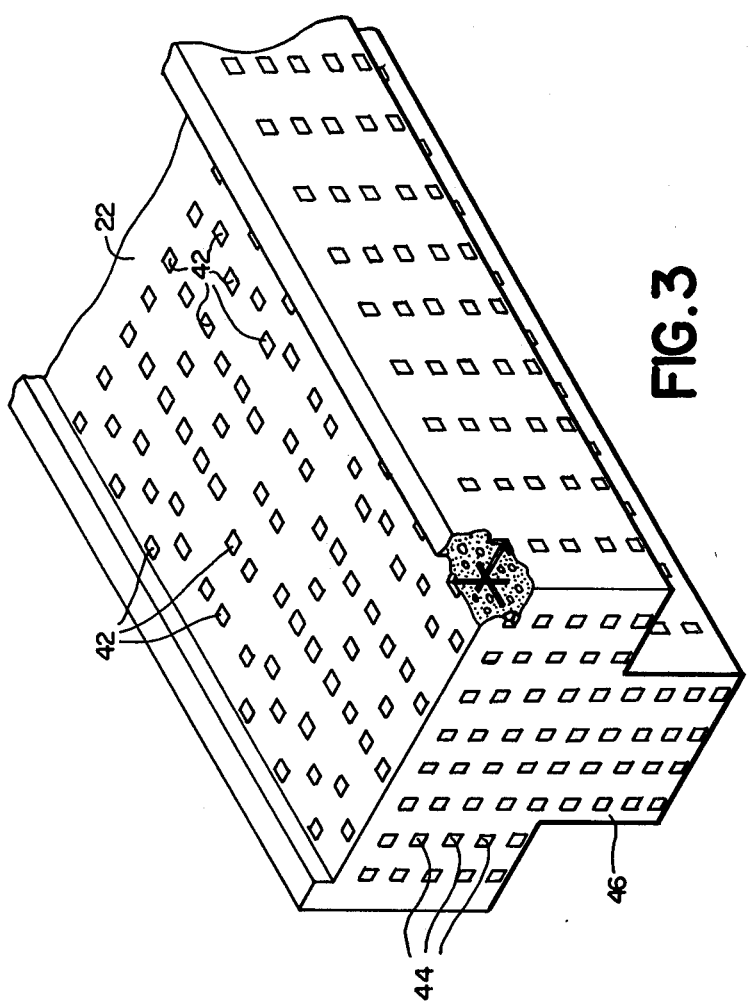
FIG. 3 is an isometric view illustrating the seismic mass involved in the present invention.

Referring to FIG. 3, details of the seismic mass 22 are illustrated. One of the features of the present invention is that the seismic mass 22 is always in compression. The seismic mass 22 includes a plurality of spaced vertical, longitudinal and transverse high strength rods 42 and 44 so as to provide three dimensional post tensioning. The rods 42 and 44 are embedded in the main body of high strength concrete 46 of the seismic mass. In the manufacture of the seismic mass 22, the rods 42 and 44 are placed in steel tubes before the concrete 46 is poured to form a mass. They are then put in tension by hydraulic jacks after the concrete has reached its full strength.

The steel rods may be 1¼" and extend through galvanized tubes of about 2 inches during formation of the mass. The rods 42 and 44 are then put on hydraulic jacks which pull them up to a desired tensile strength. Generally, the rods are pulled up to approximately 80% of the ultimate strength and held there. The ends of the rods are then cut off and separated from the hydraulic means. The result is that the mass itself is always in compression.

The reason that the mass is held in compression is that the large forces applied transversely by the actuators at the top surface tend to bend the mass. When the mass bends, the top will tend to be in tension or compression and the bottom will tend to be the opposite. It is well known that concrete cannot tolerate tension. In effect, the tension on either side is overcome when an overriding compression exists throughout the mass. Thus the amount of post tension is sufficient such that the concrete anywhere in the mass will never go into tension despite the application of heavy loads supplied thereto.

While the mass 22 is illustrated as a single piece, it may actually be made from precast slices including suitable openings therein which are then joined together by steel stick rods. The smaller pieces make it possible to provide better concrete quality. Also, forming the final mass from smaller pieces provides easier fabrication.

Figure 5:
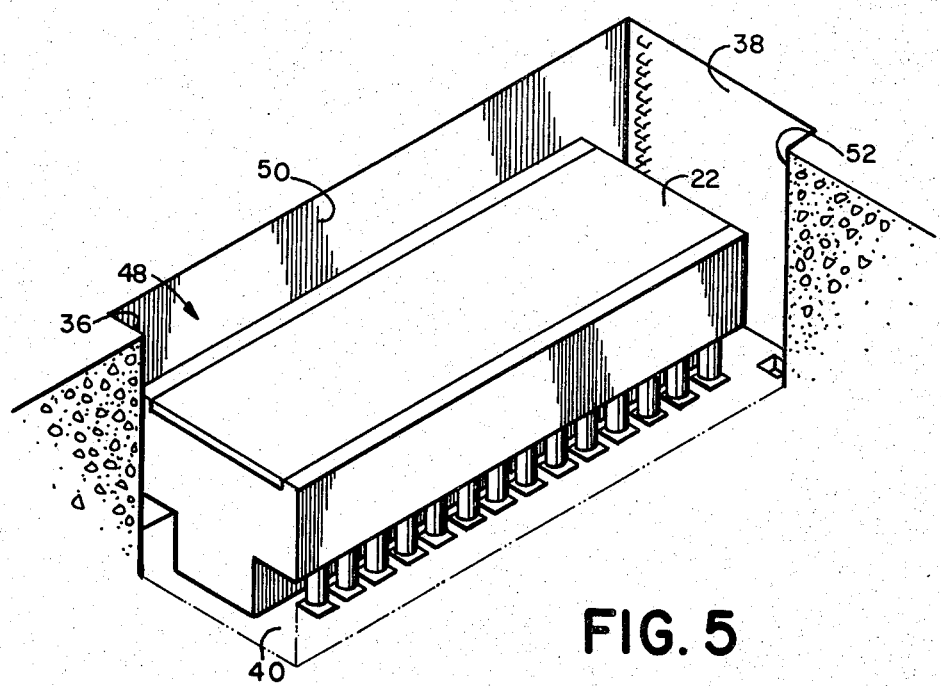
FIG. 5 is an isometric view illustrating various elements of the environmental testing facility within the pit.
Figure 6:
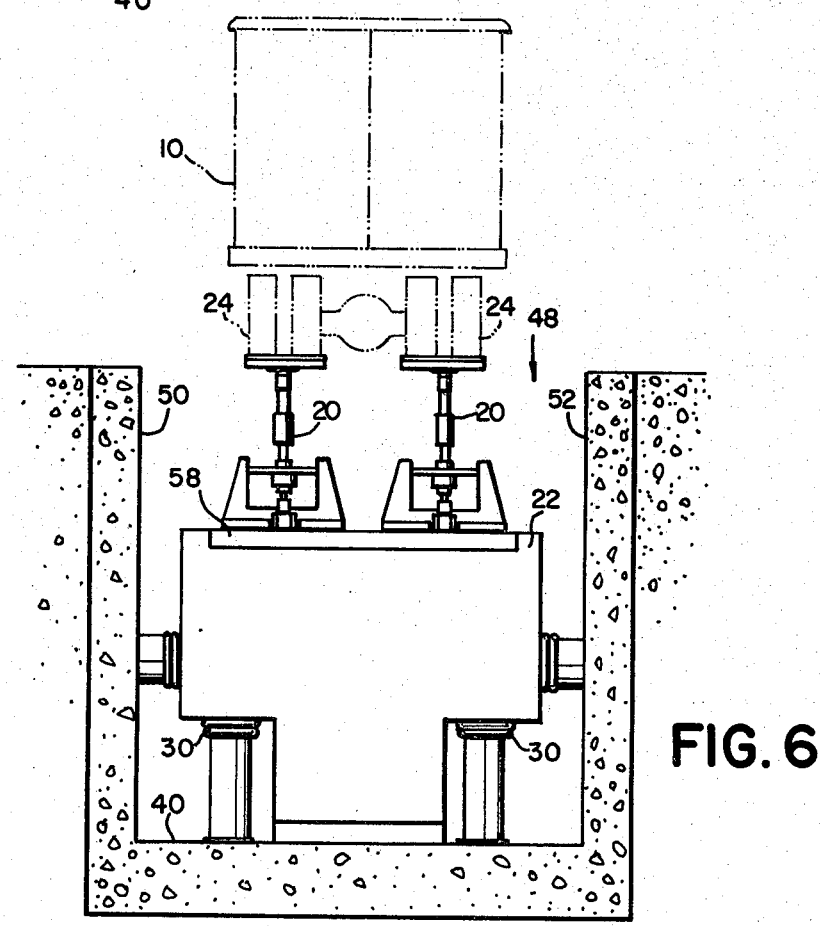
FIG. 6 is an end view of a vehicle under test.

Referring to FIG. 5, the seismic mass 22 is illustrated in the pit 48. As mentioned, the pit 48 includes a floor 40, end walls 36 and 38 and side walls 50 and 52.

It is noted that the air mounts 30 support the arms of the "T" shaped seismic mass 22. The shape of the mass has a particular advantage over rectangular masses. The reason for this is that it is desirable to support the mass of the seismic mass 22 at the center of gravity. If a rectangular mass were used, and the air bags put at the bottom in a manner similar to that illustrated, then the lateral stability of the seismic mass 22 will be affected. Normally, such a rectangular mass tends to tip one way or another. This would be true despite the lateral supports involved. The "T" shaped mass 22 not only increases the stability of the system, but also makes it possible to provide a large mass in a relatively small building area.

Figure 4:
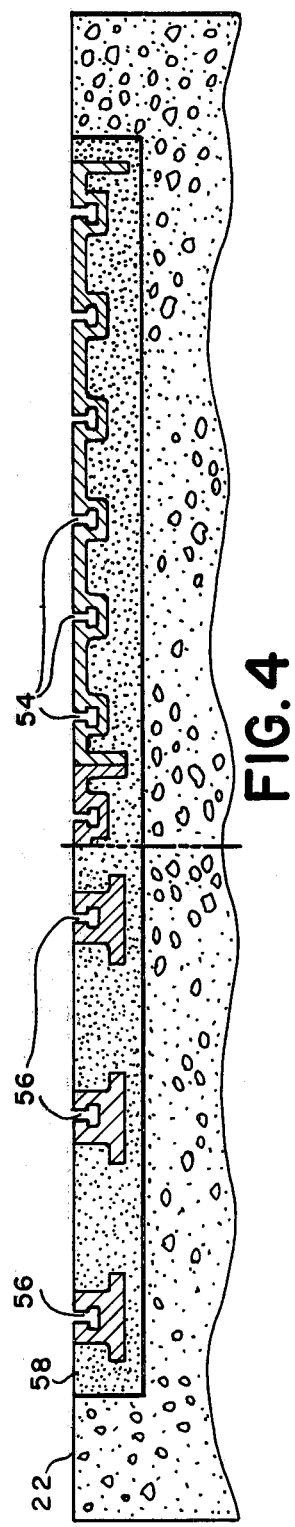
FIG. 4 is a view taken along lines 4—4 of FIG. 7.
Figure 7:
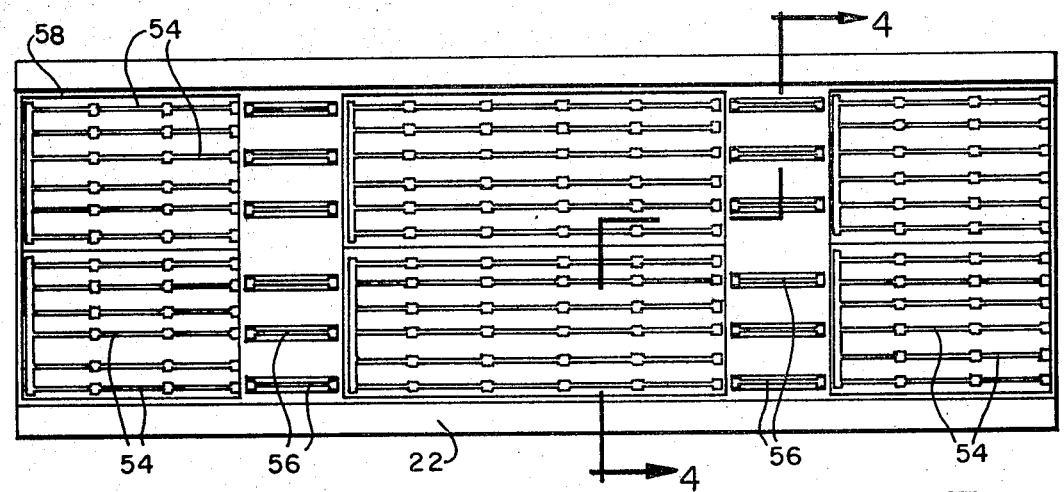
FIG. 7 is a top view of the seismic mass illustrated in previous figures.

Referring to FIGS. 4 and 7, the top of the seismic mass 22 is illustrated. A plurality of plates 54 with T-shaped slots and a plurality of rails 56 with T-shaped slots are embedded into a non-shrink grout or concrete material 58. The rails 56 and plates 54 are embedded into the grout material after the seismic mass has been poured and post tensioned. The grout material is put into a recess 58 within the seismic mass 22 in its unhardened state and is then allowed to harden to help maintain the rails and plates in place.

The rails and plates provide attachment means for the actuators which are connected between the seismic mass and the product under test. They also provide means for receiving the product under test when the product has been moved into the test area.

Figure 8:
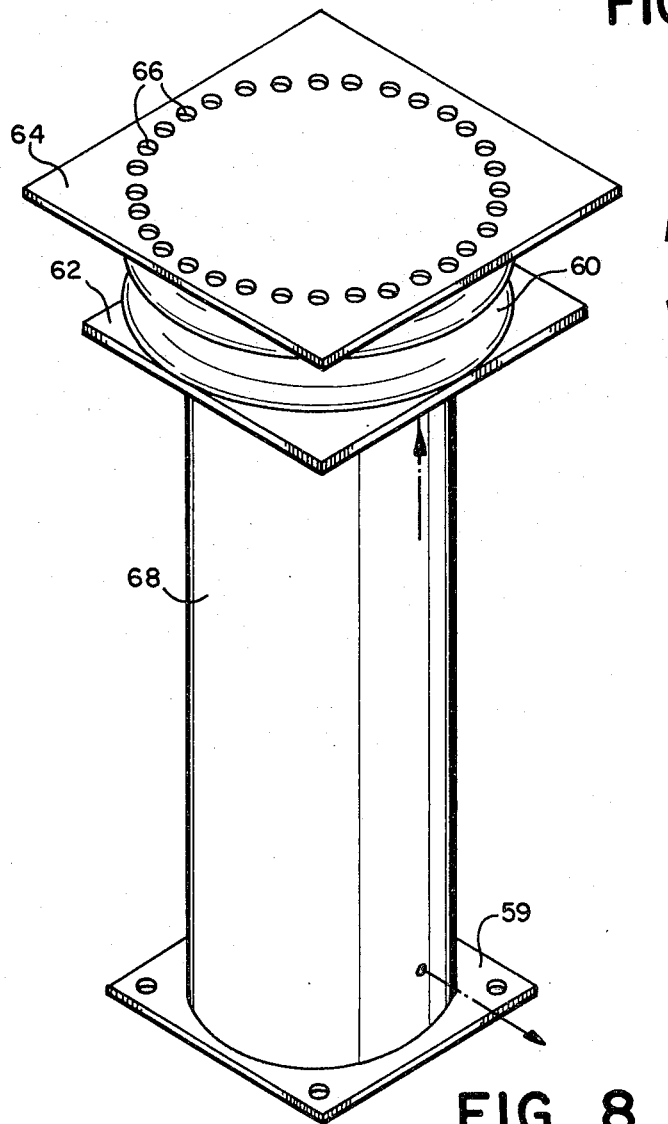
FIG. 8 is an enlarged view illustrating one of the air mounts which may be used in supporting the seismic mass in accordance with the present invention.

Referring to FIG. 8, the typical air cushion means is illustrated. The means includes a bottom plate 59 adapted to be secured to the floor or sidewalls or end walls within the pit. The air mount 60 is mounted between upper plates 62 and 64. The plate 64 includes means for attaching the plate to the bottom or sides of the seismic mass. These means may include apertures 66. An air reservoir 68 is disposed between the bottom plate 58 and the upper plate 62. The air in the air reservoir 68 may be controlled by several valves. The quantity and pressure of this air chamber dictates the lower bound of the usable isolation frequency range for the total system. The air reservoir 68 is relatively large and is connected directly in series with the air mount 60 through a large center hole in plate 62. Thus the system may be operated at relatively low resonant frequencies.

The relatively large air reservoir in series with the air mounts or cushions provide very low frequency isolation for the seismic mass in three directions, namely, vertically, laterally and longitudinally.

What is claimed is:

1. An environmental testing system for a product comprising:
   (a) a seismic mass;
   (b) a series of mounts having air cushioning means thereon for supporting said seismic mass:
   (c) a pit having a floor, a pair of side walls and a pair of end walls for receiving said seismic mass therein said mounts being connected between said seismic mass and said floor, said side walls and said end walls;
   (d) means including a plurality of actuators adapted to be connected between said seismic mass and said product under test;
   (e) means including servo valves for driving said actuators to vibrate said product under test with the reaction forces generated by said seismic mass being absorbed by said seismic mass on said air cushioning means; and
   (f) said seismic mass having a "T" shaped cross section including a top section extending parallel to said floor of said pit and a leg section extending downwardly from the center of said top section towards said floor of said pit whereby said seismic mass is supported on said air mounting means at its center of gravity.

2. An environmental testing system as set forth in claim 1 wherein said air mounting means is connected between the top section of said seismic mass and said floor, side and end walls of said pit, with said leg section of said seismic mass extending downwardly free of said air mounting means and disposed to be raised away from the floor of said pit during a testing operation.

3. An environmental testing system as set forth in claim 2 wherein said seismic mass comprises a concrete structure which is maintained in compression by a plurality of spaced vertical, longitudinal and transverse high strength metal rods embedded therein.

4. An environmental testing system as set forth in claim 3 wherein relatively large air reservoirs are connected in series with said air mounting means to permit said testing system to operate at relatively low resonant frequencies.

5. An environmental testing system as set forth in claim 4 wherein the top of said seismic mass includes a plurality of rails and plates embedded in concrete material providing means for receiving said actuators and said product under test.

6. An environmental testing system as set forth in claim 5 wherein said plurality of mechanical actuators are connected between said plates of said seismic mass and said product is connected to said rails of said seismic mass.

7. An environmental testing system as set forth in claim 6 wherein a source of electrical signals is provided to control valves of said mechanical actuators to actuate said mechanical actuators to vibrate said product under test with different force levels in accordance with a predetermined program.

8. An environmental testing system as set forth in claim 7 wherein said air mounting means comprises a plurality of air bags connected in series to said large air reservoirs and adapted to absorb the forces resulting from the vibrations of said seismic mass and said product under test and provide air isolation between said seismic mass with its product under test and said pit with its surrounding environment.

* * * * *